(12) United States Patent
Robertson et al.

(10) Patent No.: US 7,403,382 B2
(45) Date of Patent: Jul. 22, 2008

(54) REMOVABLE EXPANSION MODULE USABLE AS INTERNAL AND EXTERNAL DEVICE

(75) Inventors: Kenneth G. Robertson, San Jose, CA (US); Peter K. Lee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 10/836,344

(22) Filed: May 3, 2004

(65) Prior Publication Data

US 2005/0243503 A1 Nov. 3, 2005

(51) Int. Cl.
*H05K 5/00* (2006.01)
(52) U.S. Cl. .................................. 361/686; 361/685
(58) Field of Classification Search .............. 361/683, 361/686, 685
See application file for complete search history.

(56) References Cited

U.S. PATENT DOCUMENTS

| 5,065,262 | A | * | 11/1991 | Blackborow et al. | .......... 360/75 |
| 6,064,566 | A | * | 5/2000 | Agata et al. | .............. 361/684 |
| 6,633,486 | B2 | * | 10/2003 | Coles et al. | ............... 361/726 |
| 6,695,641 | B1 | * | 2/2004 | Lee | ........................ 439/493 |
| 6,724,619 | B2 | * | 4/2004 | Kwong et al. | ............ 361/685 |
| 6,762,936 | B1 | * | 7/2004 | Chang | .................... 361/687 |
| 6,804,123 | B1 | * | 10/2004 | Cheng | .................... 361/784 |
| 6,876,547 | B2 | * | 4/2005 | McAlister | ............... 361/685 |
| 6,891,721 | B2 | * | 5/2005 | Huang | ..................... 361/685 |
| 2001/0001529 | A1 | | 5/2001 | Behl et al. | |
| 2003/0099094 | A1 | * | 5/2003 | Coles et al. | ............... 361/726 |
| 2004/0242064 | A1 | * | 12/2004 | Chang et al. | ............. 439/564 |
| 2005/0041387 | A1 | * | 2/2005 | Lee | ........................ 361/685 |

FOREIGN PATENT DOCUMENTS

| EP | 0426414 A2 | 5/1991 |
| WO | 2004017159 A | 2/2004 |

OTHER PUBLICATIONS

European Search Report of European Application No. 05252738.9 mailed Oct. 19, 2007.

* cited by examiner

*Primary Examiner*—Jayprakash N Gandhi
*Assistant Examiner*—Ingrid Wright (57) ABSTRACT

An expansion module usable as an internal and external device is described. The module defines an interior volume, a recess for receiving a retaining latch external to the module for retaining the module positioned with respect to an expansion module sleeve, and at least two throughholes to the module interior and an alignment receptacle at one end of the module. The module includes a latch release attached to the module for expelling a retained latch from the recess, and an interface device positioned in the module interior volume, and receiving a) a standard data connector via one of the at least two throughholes and b) a power connector via another of the at least two throughholes, and including one or more expansion device connectors internal to the module interior volume for providing at least one of data signals and power received from the standard data connector and the power connector to an expansion device.

25 Claims, 10 Drawing Sheets

REMOVABLE EXPANSION MODULE USABLE AS INTERNAL AND EXTERNAL DEVICE

RELATED APPLICATIONS

This application is related to each of the following applications: "Removable Information Storage Device Enclosure," U.S. application Ser. No. 10/836,340, filed on May 3, 2004, "Interface for Expansion Module and Expansion Module Bay," U.S. application Ser. No. 10/836,338, filed on May 3, 2004, and "Removable Expansion Module Latch System," U.S. Application Ser. No. 10/836,342, filed on May 3, 2004, each assigned to the present assignee, all of which are hereby incorporated by reference in their entirety, and all of which are being filed concurrently herewith.

FIELD OF THE INVENTION

The present invention relates to an expansion module usable as an internal device of a computer system and an external device of the computer system.

BACKGROUND

It is known in the art to use internal volume in a computer system to connect additional storage devices, e.g., hard drives, for the computer system. The additional storage device connection process requires tools and knowledge regarding opening the computer system and adding/replacing existing storage device. Most users of computer systems are incapable or uncomfortable with opening up a computer system to add additional devices. Most frequently, additional devices are only added by the computer system manufacturer.

Additionally, knowledge of different connectors for data signals and power is required by the user or technician and different computer systems require different, and at times incompatible and custom, connectors for data signals and power.

External storage devices using standard USB connectors to connect to external standard USB connectors on computer systems are used by user to connect additional storage devices; however, these external storage devices require the use of additional cables for both power and data signals and oftentimes an additional power transformer for providing power to the external storage device. The external nature of these devices and the associated cabling and power requirements contributes to a cluttered and potentially hazardous environment surrounding the computer system. Users trip over cabling potentially injuring themselves or causing damage to the external storage device or computer system connected at one end of the cable.

Manufacturers producing internal drive or external drive solutions have to stock both types of hard drive assemblies thereby increasing cost to the manufacturer. Additionally, users are required to purchase separate assemblies for using the same drive in an internal or external configuration. Further, additional strain and possibility of damage to the drive and drive connectors is introduced by requiring the user to install and remove the drive between the internal and external assemblies.

SUMMARY

The present invention provides an expansion module usable as an internal device of a computer system and an external device of the computer system. In a first aspect, the module defines an interior volume, a recess for receiving a retaining latch external to the module for retaining the module positioned with respect to an expansion module sleeve, and at least two throughholes to the module interior and an alignment receptacle at one end of the module. The module includes a latch release attached to the module for expelling a retained latch from the recess, and an interface device positioned in the module interior volume, and receiving a) a standard data connector via one of the at least two throughholes and b) a power connector via another of the at least two throughholes, and including one or more expansion device connectors internal to the module interior volume for providing at least one of data signals and power received from the standard data connector and the power connector to an expansion device.

In a second aspect, the module defines an interior volume and at least two throughholes to the module interior and an alignment receptacle at one end of the module. The module includes an interface device positioned in the module interior volume, and receiving a) a standard data connector via one of the at least two throughholes and b) a power connector via another of the at least two throughholes, and including one or more expansion device connectors internal to the module interior volume for providing at least one of data signals and power received from the standard data connector and the power connector to an expansion device and for retaining the module within an expansion module sleeve.

A method aspect includes inserting the expansion module into an expansion module sleeve in a computer system, removing the expansion module from the expansion module sleeve, and externally connecting the expansion module to the computer system.

Still other advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, the mechanism of the present invention provides an expansion module usable as an internal device of a computer system and an external device of the computer system.

The expansion module according to an embodiment of the present invention, e.g., a removable storage device such as a hard disk drive (HDD), consists of an expansion device mounted in an expansion module as described in detail below. In an external application, the expansion module can sit in a horizontal orientation, for instance, on a table surface. The expansion module can also be positioned in a vertical orientation or used with a mounting stand designed to maintain the module in an upright position. In such external applications, the user connects cables to the rear of the module for USB connection and DC power connection. The expansion module operates as a standalone device which the user can use with a variety of computers and systems.

In one embodiment, the expansion module is an input device for providing data to a computer system, e.g., audio, video, or other input data. In another embodiment, the expansion module is an output device for output of data from the computer system, e.g., audio, video, or other output data. In another embodiment, the expansion module is a combined input and output device.

In an internal application in a computer system, a user can use the expansion module plugged directly into the computer or other system requiring additional storage capacity. This is accomplished by sliding the expansion module into a sleeve mounted in the computer or other system. In one embodiment, the sleeve has a flip-up shutter covering the opening when the expansion module is not installed. The sleeve includes a blind-mating connector system mating the USB and DC power connections at substantially the same time. The connector system has enough float to allow mating over the tolerance range allowed by movement of the expansion module within the expansion module sleeve.

In one embodiment, the expansion module includes recesses built-in to assist in securing the module and latch releases built-in to assist in releasing latches retaining the module by being interfit with the recesses in a sleeve for a computer system internal application, the latches and latch releases are unobtrusive and cosmetically very clean-looking when the module is used in an external application.

An embodiment of the present invention is described with reference to use in conjunction with the expansion module of co-pending U.S. patent applications entitled, "Interface for Expansion Module and Expansion Module Bay," filed on May 3, 2004, "Removable Information Storage Device Enclosure," filed on May 3, 2004, and "Removable Expansion Module Latch System," filed on May 3, 2004, all assigned to the present assignee, and hereby incorporated by reference in their entirety herein. However, it is to be understood that the present invention is applicable to other different configurations.

A more detailed description of the Expansion Module and Expansion Module Bay may be found in the above-referenced patent applications incorporated herein by reference. An overview description of the module and module bay is provided herein.

Figure 1:
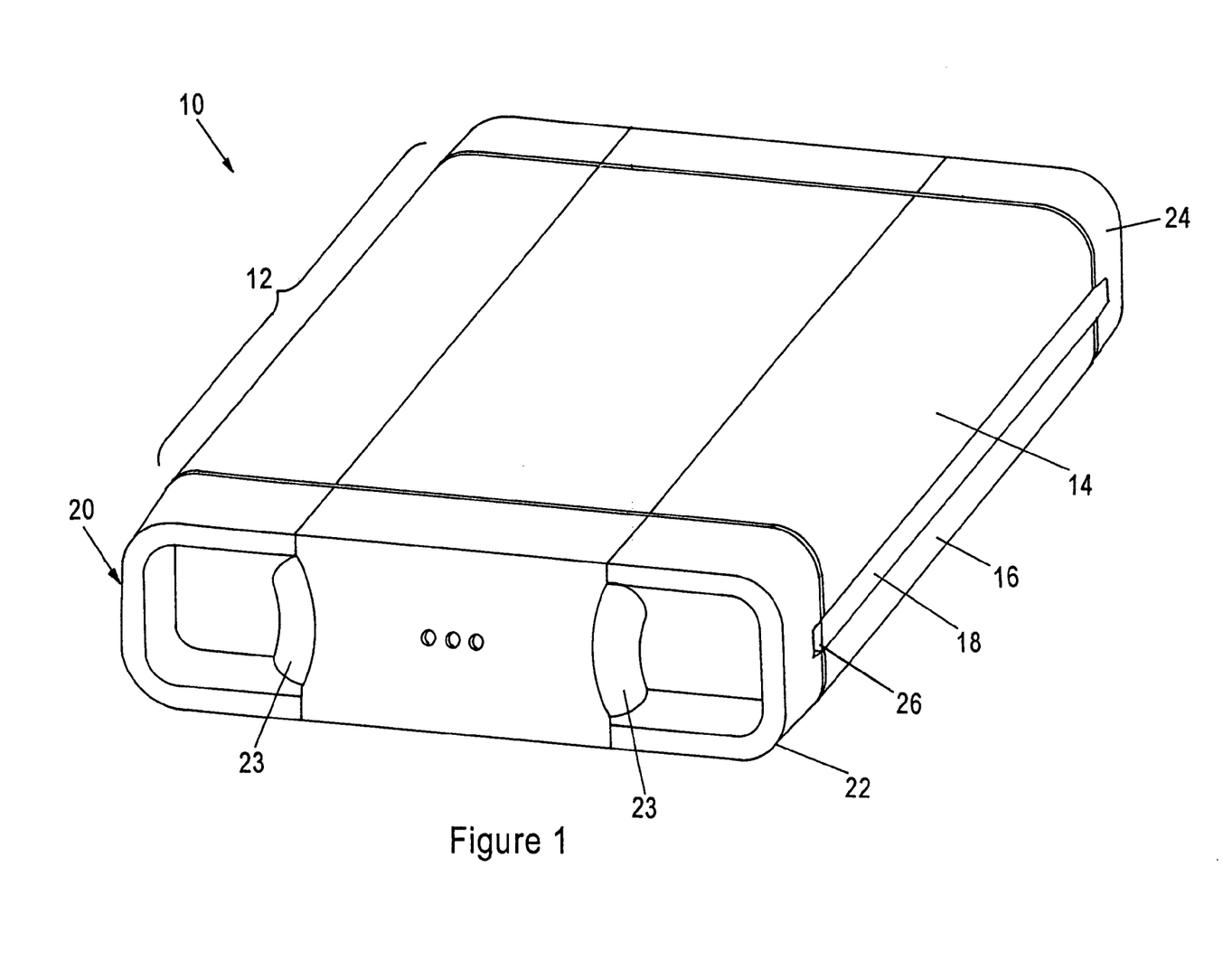
FIG. 1 is a front perspective view of an expansion module according to an embodiment of the present invention.

FIG. 1 depicts an expansion module 10 usable in conjunction with an embodiment of the present invention. Expansion module 10 is a rounded rectangular enclosure for receiving an expansion device (not shown), e.g., a hard disk drive.

Expansion module 10 includes a housing 12 including an upper rectangular channel 14 having a generally U-shaped cross-section connected to a lower rectangular channel 16 having a generally U-shaped cross-section to form a rounded rectangular enclosure having a rounded rectangular opening at each end. A pair of C-shaped connecting strips 18, 20 join the open ends of the U-shaped channels 14, 16 to each other. C-shaped connecting strips 18, 20 and the mechanism for joining U-shaped channels 14, 16 are more fully described in co-pending U.S. Patent application titled, "Removable Information Storage Device Enclosure."

In one embodiment, upper rectangular channel 14 and lower rectangular channel 16 are made of a thermally conductive material to assist in removing heat from within the expansion module 10. In another embodiment, housing 12 may have a non-rounded rectangular cross-section, an oval or circular cross-section, and a polygonal cross-section.

A first end cap 22, having a rounded rectangular cross-section similar to housing 12, attaches at one open end of housing 12 thereby closing the opening. End cap 22 closes the open end of housing 12 to prevent entry of dust and other contaminants and retain expansion device (not shown) within the housing 12 interior. End cap 22 includes a pair of latch releases 23 (partially shown) for inserting and removing expansion module 10 from an expansion module bay 60 (FIG. 3) described in detail below. Construction and operation of latch release 23 is described below and in more detail in co-pending U.S. Patent application titled, "Removable Expansion Module Latch System."

Figure 3:
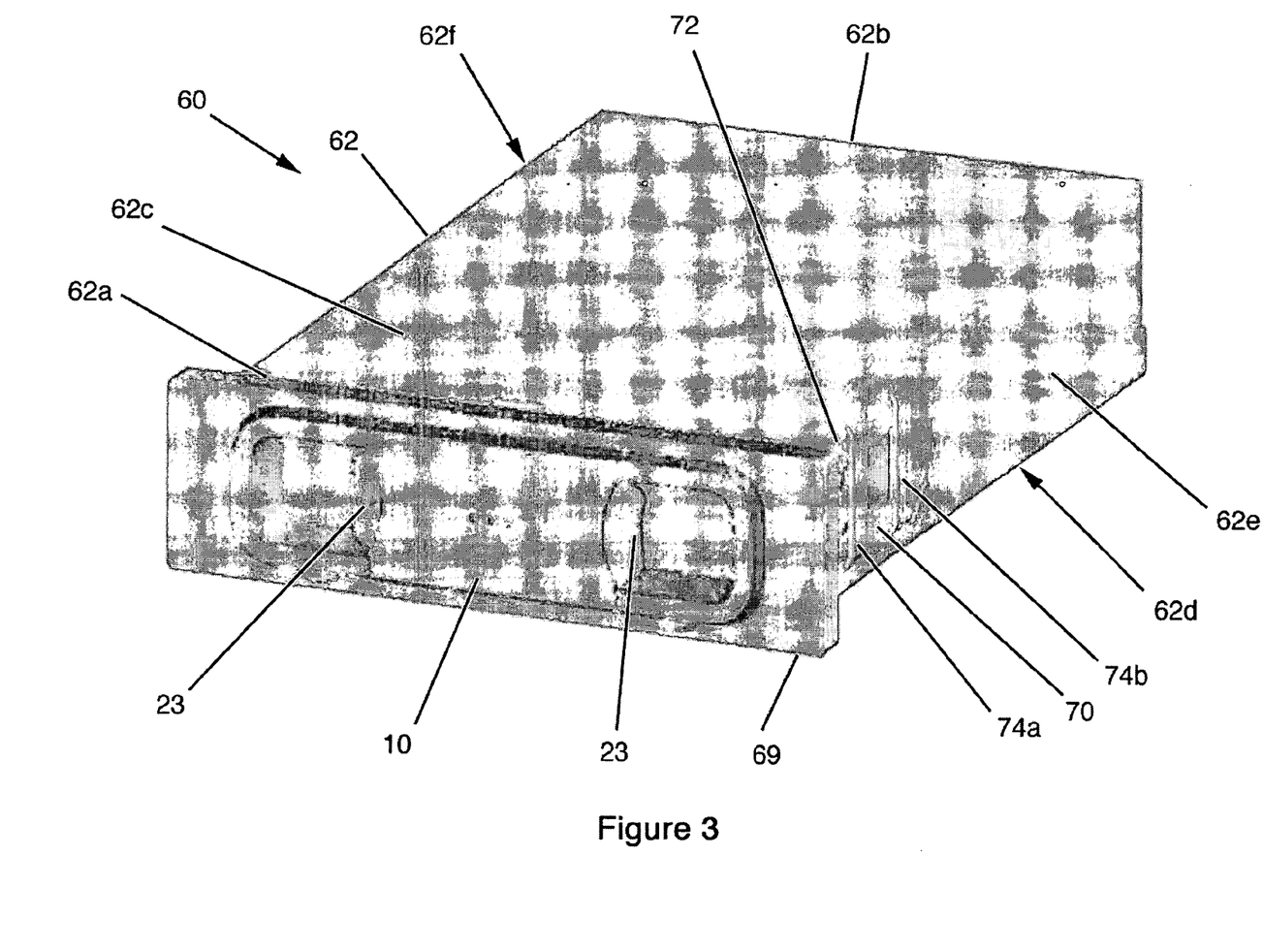
FIG. 3 is a perspective view of the expansion module of FIG. 1 inserted in the expansion module bay of FIG. 2.

End cap 22 further includes a pair of recesses 26 along each side of the end cap and generally aligned with connecting strips 18, 20 for receiving a latch 76 (FIG. 4) to retain module 10 in expansion module bay 60 (FIG. 3). In one embodiment, end cap 22 includes a single recess 26 along one side and a single latch release 23 toward the distal side of the end cap from the single recess.

In one embodiment, end cap 22 attaches to one of rectangular channels 14, 16 and the other rectangular channel 16, 14 attaches to the first rectangular channel via connecting strips 18, 20, as described above. In this manner, end cap 22 need not be removed in order to access housing 12 interior.

A second end cap 24, having a rounded rectangular cross-section similar to housing 12 and first end cap 22, attaches at the other open end of housing 12 at the distal end from end cap 22 thereby closing both openings of the housing. End cap 24, described in further detail in conjunction with the above-reference co-pending application titled, "Interface for Expansion Module and Expansion Module Bay," closes the open end of housing 12 to minimize entry of dust and other contaminants and retain expansion device (not shown) within the housing 12 interior and includes openings for connectors for providing power to and transmitting and receiving data signals to/from module 10.

In one embodiment, end cap 24 attaches to one of rectangular channels 14, 16 and the other rectangular channel 16, 14 attaches to the first rectangular channel via connecting strips 18, 20, as described above. In this manner, end cap 24 need not be removed in order to access housing 12 interior.

Figure 2:
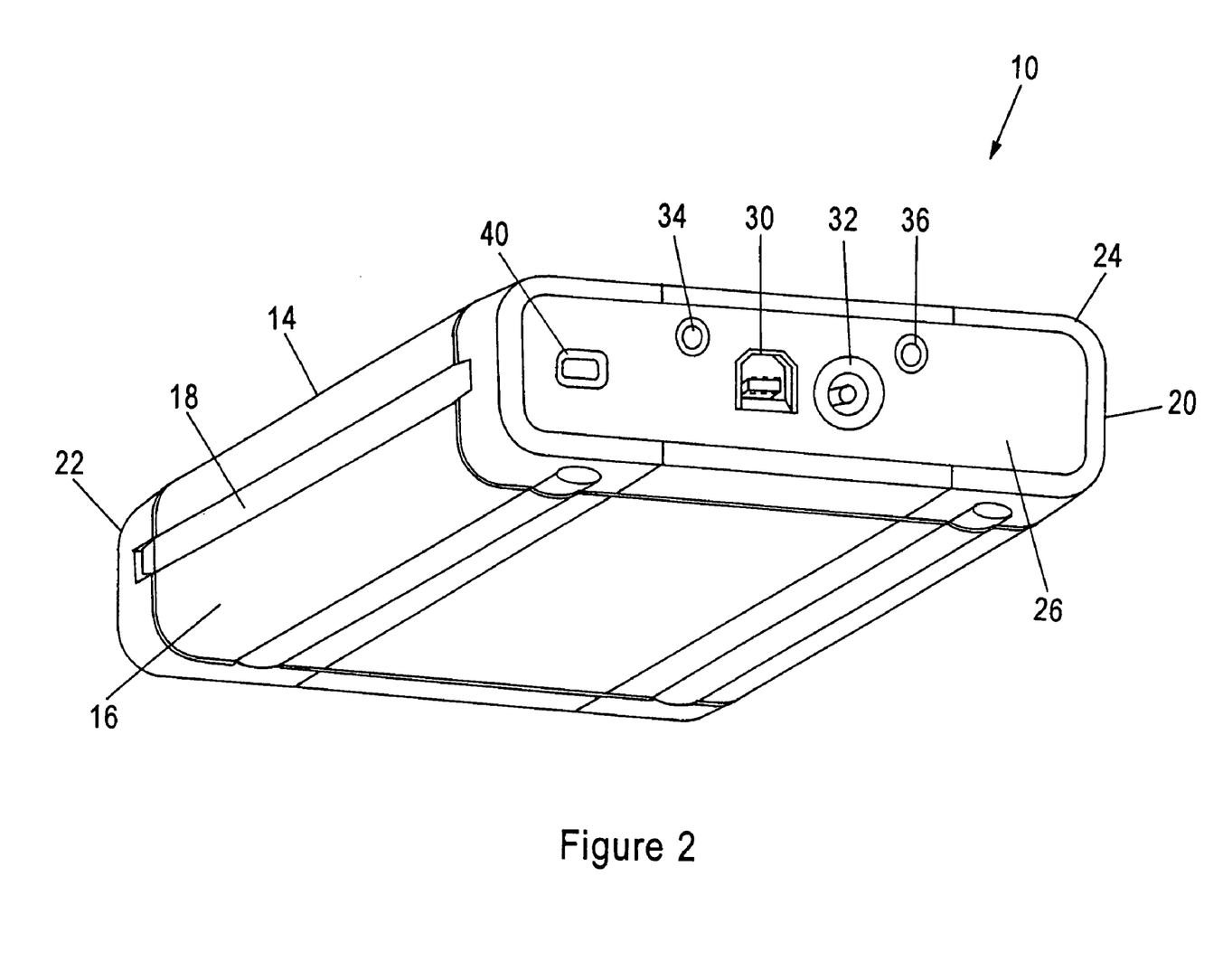
FIG. 2 is a rear perspective view of the expansion module of FIG. 1.

FIG. 2 depicts a rear perspective view of expansion module 10. An outer face 26 of end cap 24, in a plane parallel with the open end of housing 12 covered by end cap 24, includes a data connector opening 30, a power connector opening 32, a first alignment receptacle 34, and a second alignment receptacle 36 for connecting with the expansion module bay (FIG. 3). Data connector opening 30 and power connector opening 32 each define a throughhole in outer face 26 enabling a connection from module exterior to interior. As depicted in FIG. 2, data connector opening 30 is sized to fit a standard USB Type B connector and power connector opening 32 is sized to fit a standard DC power connector, each known to persons skilled in the art.

In one embodiment, openings 30, 32 are sized to enable an appropriate connector, i.e., USB Type B connector and power connector, from expansion module bay to pass through the opening and mate with the corresponding connector within housing 12. That is, connectors within housing 12 do not protrude beyond outer face 26.

First alignment receptacle 34 and second alignment receptacle 36 define substantially cylindrical depressions inward to interior of module 10 from outer face 26 for receiving a corresponding pair of spaced alignment pins from connector 68 mounted in expansion module bay 60. Alignment receptacles 34, 36 receiving alignment pins from connector 68 mounted in expansion module bay 60 align module 10 in position within the module bay thereby aligning data connector opening 30 and power connector opening 32 with the data connector and power connector from the module bay.

In one embodiment, alignment receptacles 34, 36 extend farther than the greater depth of either connector associated with data connector opening 30 and power connector opening 32. That is, alignment receptacles 34, 36 receive alignment pins from the module bay prior to data connector opening 30 or power connector opening 32 receiving a connector from the module bay. In this manner, alignment pins reduce the possibility of damage to connector 68 and the data connector and power connector within data connector opening 30 and power connector opening 32, respectively.

In another embodiment, alignment receptacles 34, 36 are positioned non-equi-distant along the outer face 26. That is, first alignment receptacle 34 is positioned closer to one of the left or right edges of outer face 26 (viewing end cap 24 end on) than second alignment receptacle 36 is positioned with respect to either of the left or right edges. In another embodiment, alignment receptacles 34, 36 are positioned non-equi-distant top-to-bottom along the outer face 26.

Figure 7:
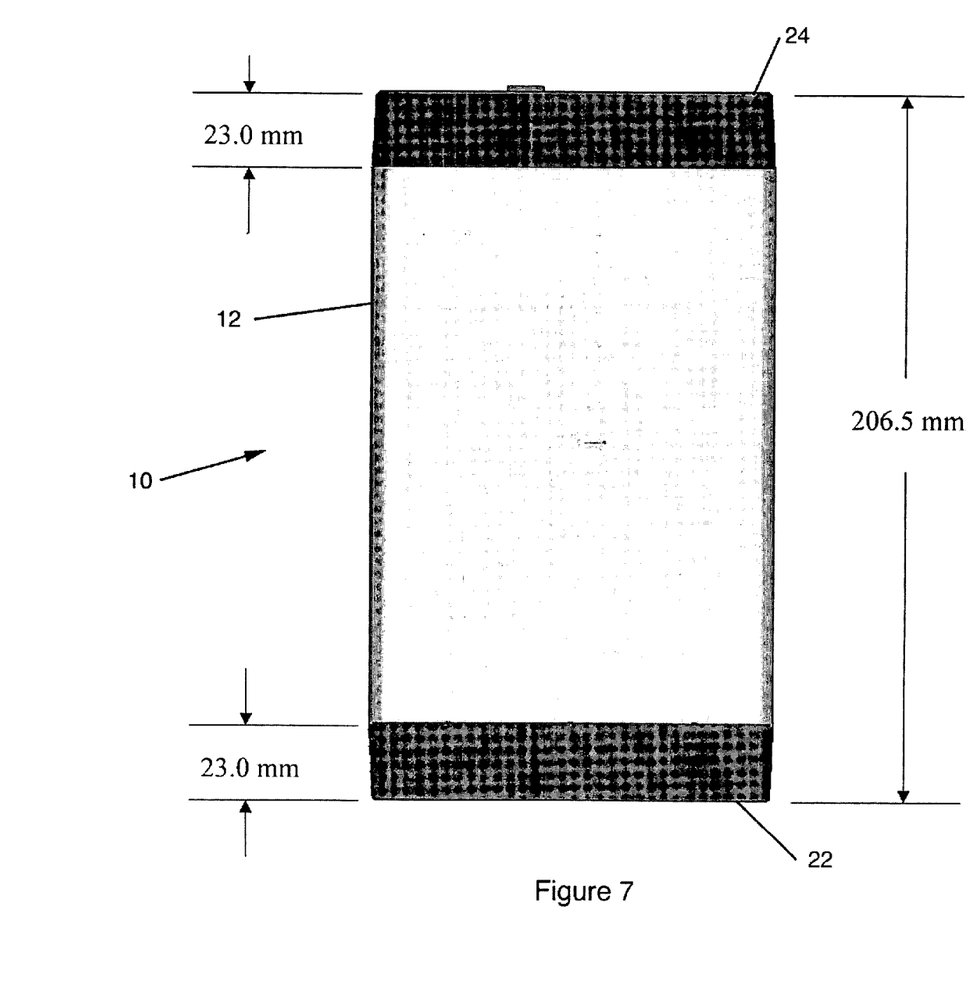
FIG. 7 is a top view of an expansion module according to an embodiment of the present invention.
Figure 8:
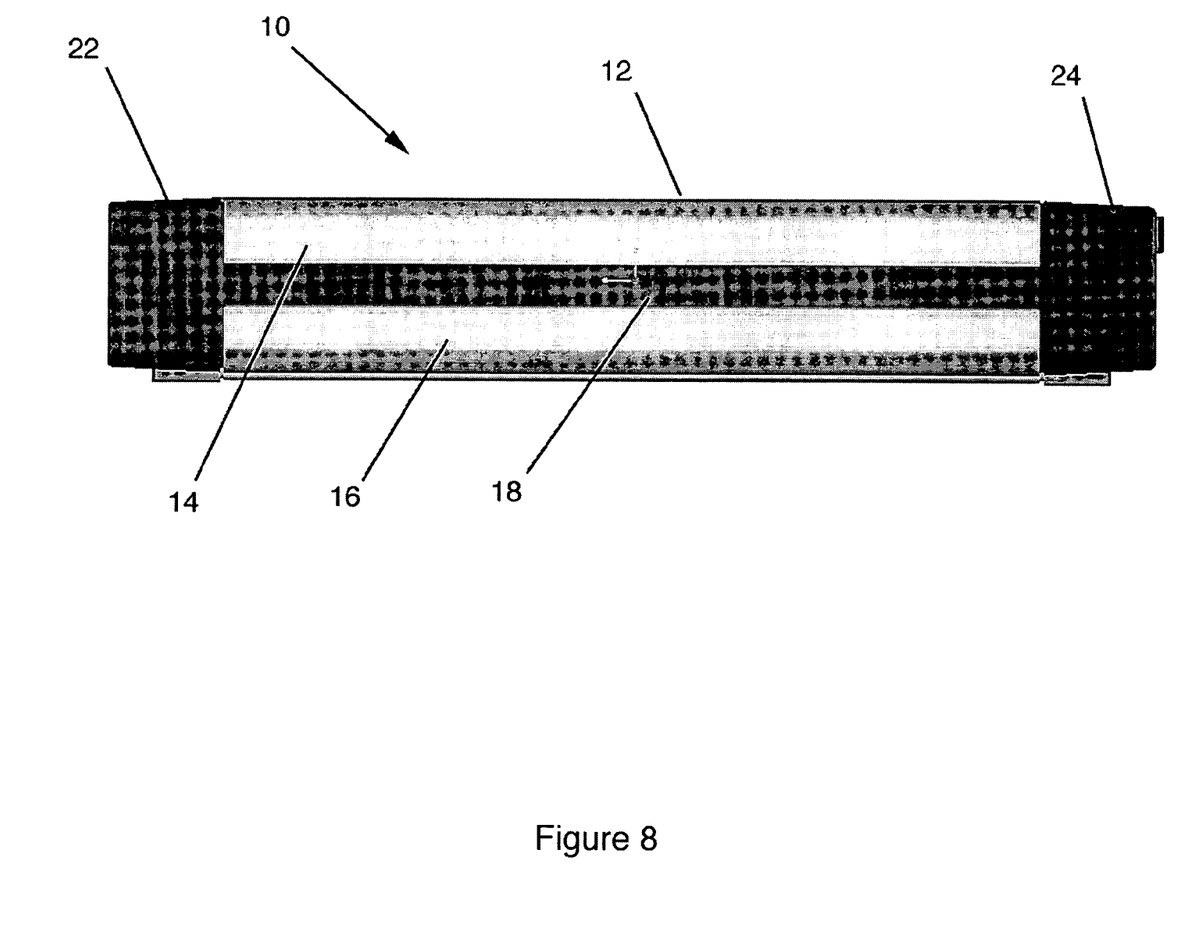
FIG. 8 is a side view of the expansion module of FIG. 7.
Figure 9:
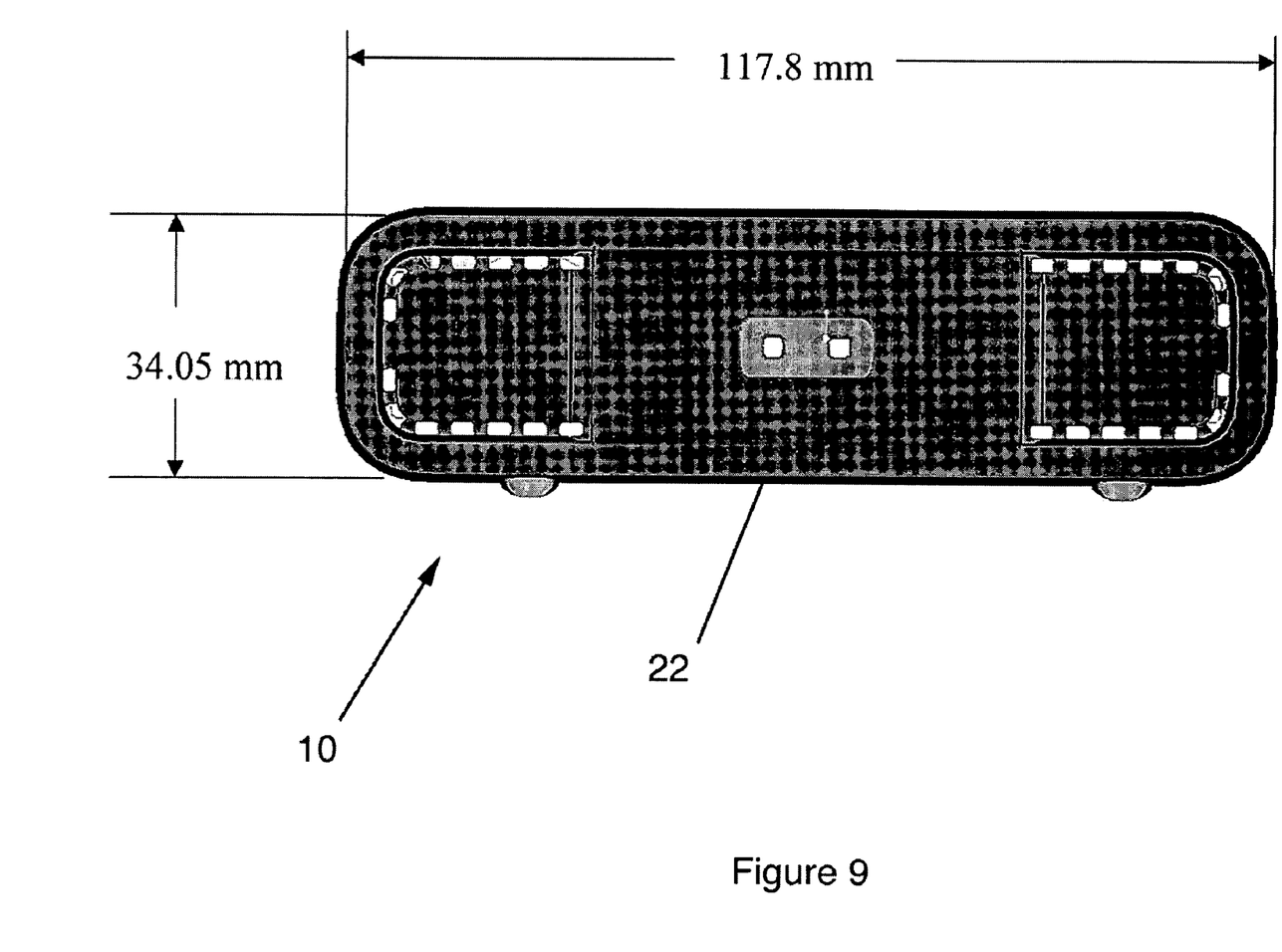
FIG. 9 is a front view of the expansion module of FIG. 7.

FIG. 7 depicts a top view of an expansion module 10 in accordance with an embodiment of the present invention. As depicted in the FIG. 7 embodiment, the length of the assembled expansion module 10 is 206.5 millimeters (mm) and each end cap 22, 24 is 23 mm wide. FIG. 8 depicts a side view of the expansion module 10 of FIG. 7. FIG. 9 depicts a front view of the expansion module 10 of FIG. 7. As depicted in FIG. 9, the width of expansion module 10 is 117.8 mm and the height is 34.05 mm.

Figure 10:
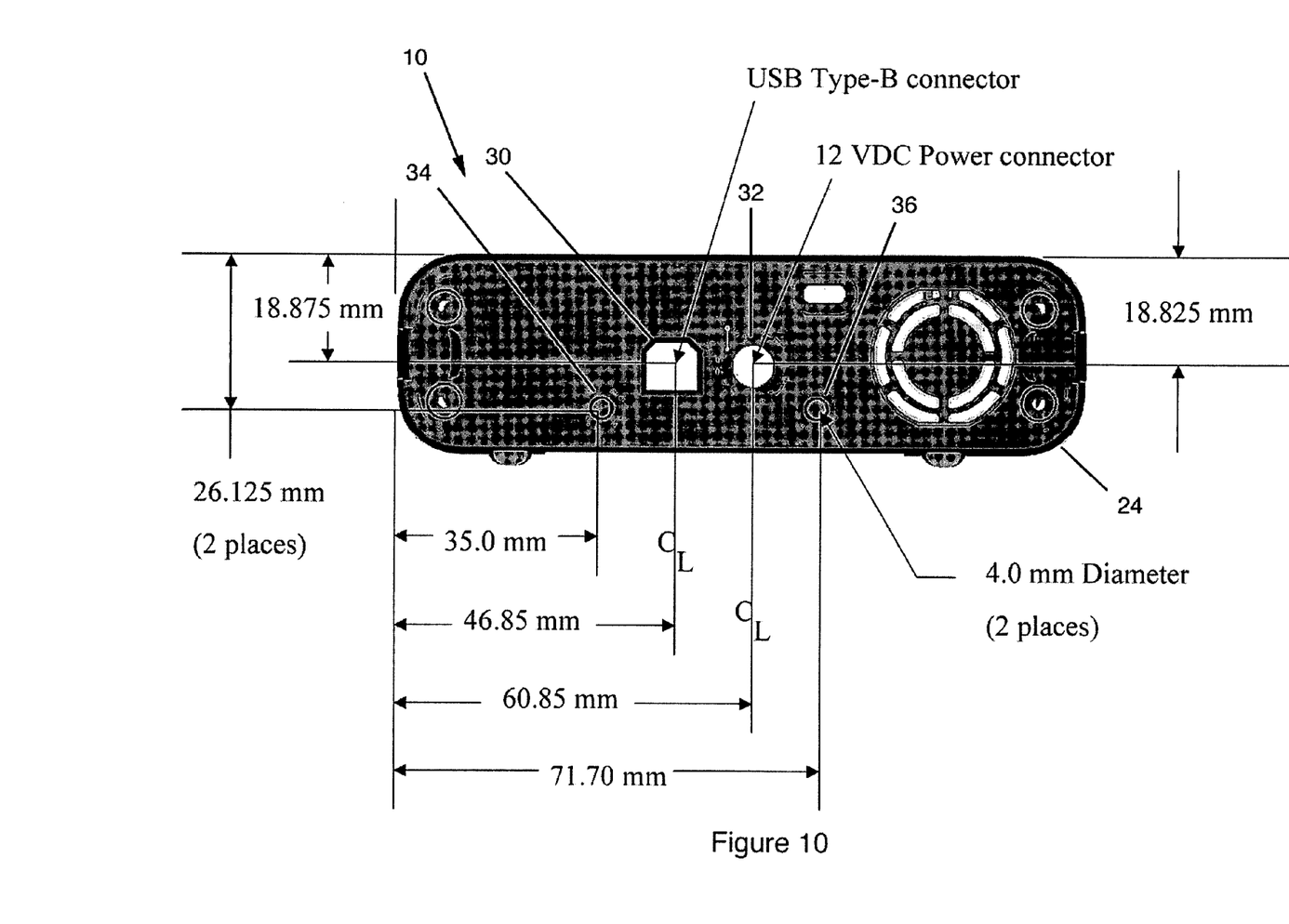
FIG. 10 is a rear view of the expansion module of FIG. 7.

FIG. 10 depicts a rear view of the expansion module 10 of FIG. 7. As depicted in FIG. 10, the center of alignment receptacles 34, 36 are 35 mm and 71.70 mm, respectively, from the left side of expansion module 10 when viewed from the rear. The center of alignment receptacles 34, 36 is 26.125 mm from the top of expansion module 10. Alignment receptacles 34, 36 are 4.0 mm in diameter. The centerline of the data connector opening 30 and power connector opening 32 are 46.85 mm and 60.85 mm, respectively, from the left side of expansion module 10. The center of data connector opening 30 is 18.875 mm from the top of expansion module 10 and the center of power connector opening 32 is 18.825 mm from the top of expansion module 10. It is to be understood that other dimensions and slight variations from the above dimensions for expansion module 10 are possible as long as the module fits within the expansion module bay 60.

In one embodiment, a lock opening 40 depicted in FIG. 2 defines a throughhole from module 10 exterior to interior enabling insertion of a locking device, e.g., a cable lock such as a Slim Microsaver Security Cable available from Kensington Technology Group. Lock opening 40 may be used to secure module 10 in a particular location using a cable lock or to secure module 10 within expansion module bay 60 (FIG. 3).

FIG. 3 depicts an expansion module bay 60 according to an embodiment of the present invention having the above-described expansion module 10 positioned in the interior of the module bay and latch 76 (FIG. 4) interfit in recess 26 of the module.

Module bay 60 includes an elongated parallelepiped module sleeve 62 having a front opening 62a in one face and a rear face 62b for receiving a connector 68 from a computer system (not shown). Connector 68 is able to float with respect to rear face 62b. Front opening 62a is sized to receive expansion module 10 to the interior of module bay 60. Module sleeve 62 further includes a top side 62c, a bottom side 62d (not shown), a right side wall 62e, and a left side wall 62f (not shown).

In one embodiment, module bay 60 includes a trim panel 69 attached at the front opening 62a having a throughhole size to enable module 10 to pass through the panel and extend into the interior of the module bay. Advantageously, trim panel 69 provides a clean appearance to the front of module bay 60 installed in a computer system.

Module bay 60 is mounted within a standard drive bay of a computer system (not shown) via standard mounting hardware and a connector 68 (FIG. 4) connects to rear face 62b to provide data and power connections to module 10 when inserted in module bay 60.

Figure 4:
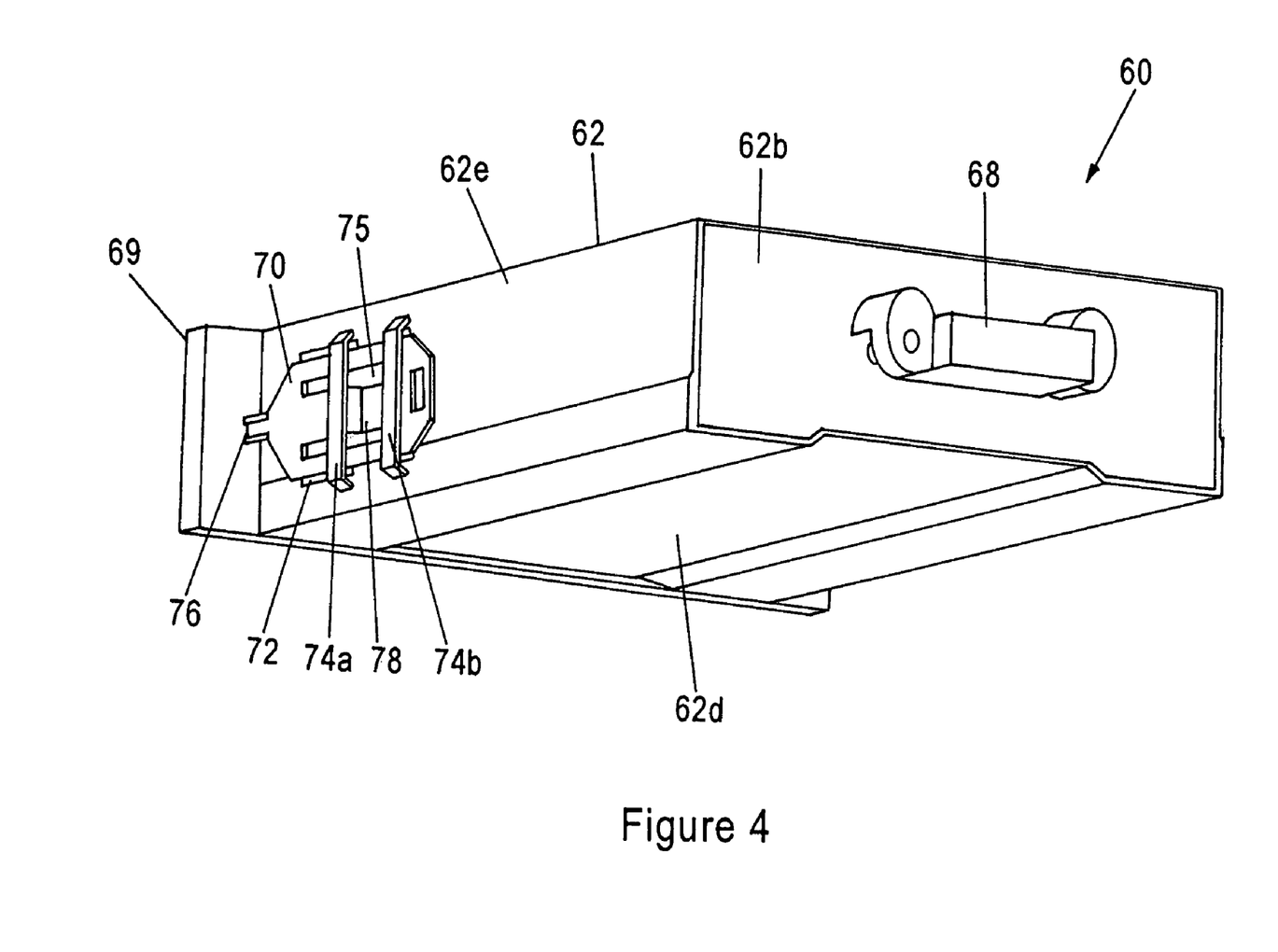
FIG. 4 is a rear perspective view of the expansion module bay of FIG. 3.

Referring now to FIG. 4, module sleeve 62 includes a latch clip 70 mounted on right side wall 62e for retaining an inserted expansion module 10. Module sleeve 62 includes a second latch clip (not shown) mounted on left side wall 62f in the same configuration and operation of latch clip 70 and therefore only latch clip 70 is described below. Latch clip 70 extends in a direction parallel to the right side wall 62e and is positioned over a side wall opening 72. Retaining ribs 74a, 74b, formed as part of right side wall 62e of sleeve 62, retain the latch clip 70 in position with respect to opening 72 and connect either side of opening 72 from near the top of right side wall 62e to near the bottom of the right side wall. In another embodiment, retaining ribs 74a, 74b may be replaced by a single retaining rib and are attached rather than being formed as a part of side wall 62e. Latch clip 70 fits between right side wall 62e and retaining ribs 74a, 74b.

Latch clip 70 is substantially flat, except as noted and described below, and approximately the same thickness as side wall 62e. Latch clip 70 has a central substantially rectangular opening 75. In one embodiment, latch clip 70 has a generally hexagonal shape larger than generally hexagonal-shaped opening 72.

Latch clip 70 includes a latch 76 at the end closest to front face 62a of sleeve 62 and a paddle 78 positioned within central opening 75 between latch 76 and the distal end of latch 76 and connected to latch 76. Construction and operation of latch clip 70 and interaction with latch release 23 are more fully described in co-pending U.S. Patent application titled, "Removable Expansion Module Latch System."

With the expansion module bay 60 empty, latch clip 70 is biased such that a portion of paddle 78 extends into the interior of sleeve 62 through opening 72 of right side wall 62e and also through opening 75 of the latch clip. Further, latch 76 does not intrude into the interior of sleeve 62.

With an expansion module 10 positioned in module bay 60, one side of the module contacts the intruding portion of paddle 78 and urges the portion in a direction toward the exterior of sleeve 62, i.e., toward opening 75 of latch clip 70. Retaining rib 74a prevents latch clip 70 from moving outward from sleeve 62 and acts as a pivot point causing the end of latch clip 70 having latch 76 attached to move toward the interior of sleeve 62 and thereby urge latch 76 inward. With expansion module 10 inserted in module bay 60 and the side of the module contacting paddle 78 after the door has rotated open, the module urges the paddle away from the module and in reaction the paddle urges the latch 76 toward the module and into the module recess thereby retaining the module positioned in the module bay.

As module 10 slides into module bay 60, the side of the module contacts a portion of paddle 78 and urges the paddle away from the module. As the portion of paddle 78 is urged away from module 10, latch 76 moves toward the module and into contact with the side of the module contacting the portion of paddle 78. Force levered from the module contacting portion of paddle 78 retains latch 76 in contact with the module side as the module is slid into module bay 60. As module 10 slides into the final position within module bay 60, latch 76 snaps into position in recess 26 of the module retaining the module in the module bay.

Figure 5:
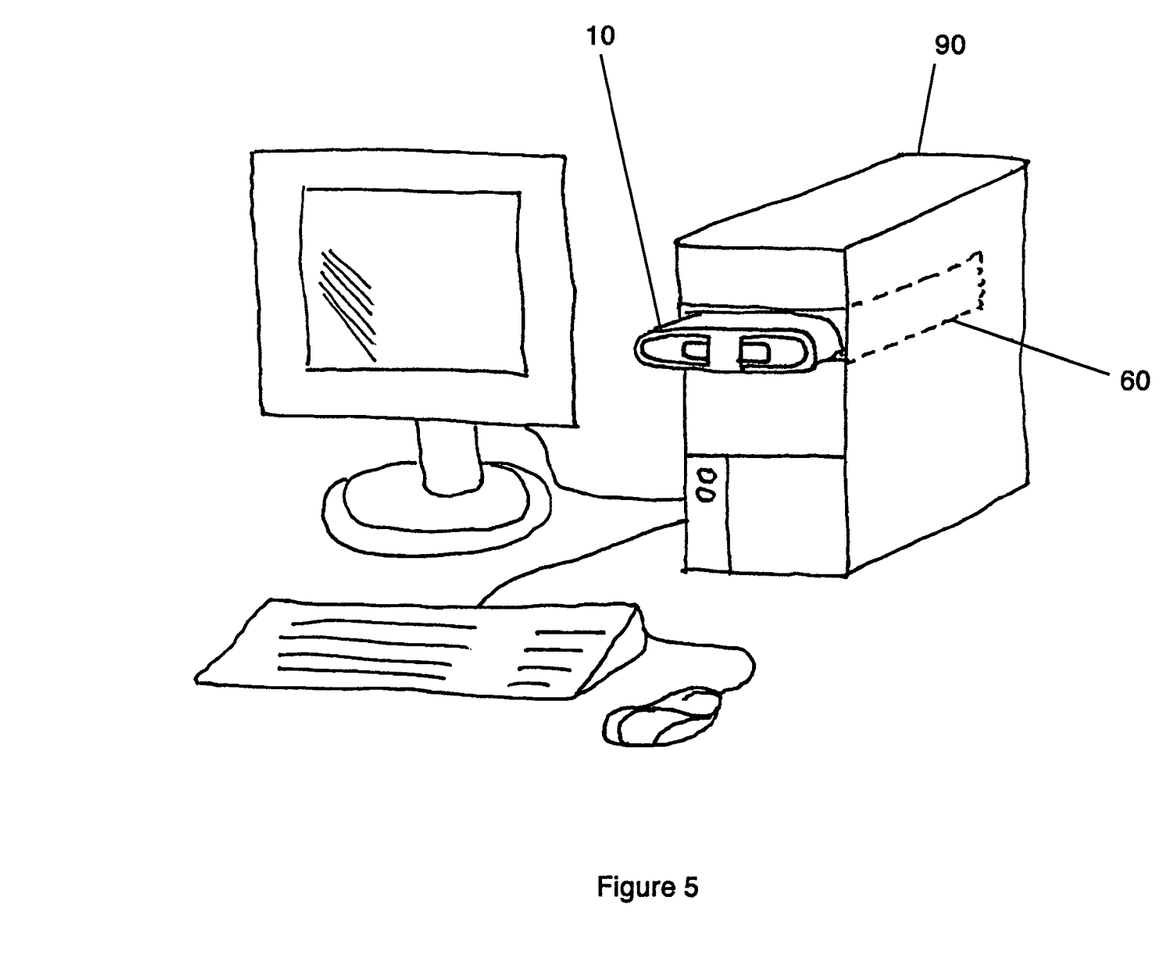
FIG. 5 is a view of an expansion module and expansion module bay according to an embodiment of the present invention installed in a computer system.

FIG. 5 depicts expansion module 10 partially inserted into expansion module bay 60 (dashed lines) installed in a computer system 90. After installation in the computer system 90, a user grasps one or both of the pair of latch releases 23 to unlatch (described above) and remove the module 10 from the computer system by pulling the module out from the module bay 60. In another embodiment, expansion module 10 lacks the pair of latch releases 23 and the user grasps the front of module 10 and removes module 10 from the computer system by pulling the module out from the module bay 60.

Figure 6:
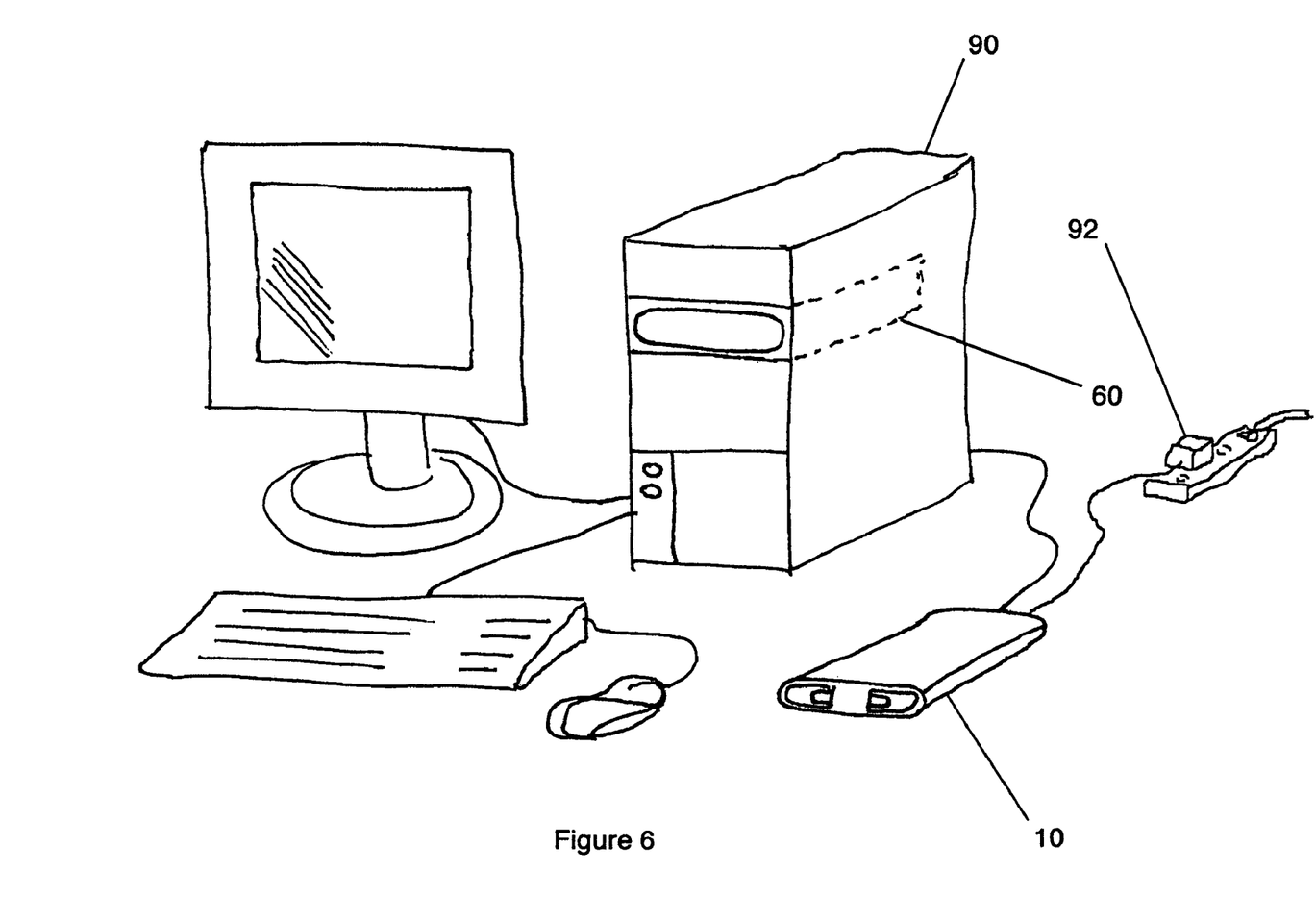
FIG. 6 is a view of the expansion module of FIG. 5 externally connected to the computer system of FIG. 5.

FIG. 6 depicts expansion module 10 externally connected to computer system 90 and a power adapter 92. Expansion module 10 connects to a standard data connection (not shown) on computer system 90.

Advantageously, an embodiment according to the present invention provides an expansion module usable in both internal and external application and allows a manufacturer and/or retailer to stock only one product to fill both needs. In contrast, previous solutions fail to provide the combination of internal or external applications, as necessary. Past solutions are either one or the other, either internal expansion device capabilities or external expansion device capabilities.

Further, for versions of the expansion module having latches, latches of previous internal application drives include tabs protruding from the latches extending beyond the drive surface when used externally. The protruding tabs affects the cosmetic appearance, as well as, opens up the possibility of tabs getting caught and/or damaged or damaging the drive.

It will be readily seen by one of ordinary skill in the art that the present invention fulfills all of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An expansion module usable as an internal and external device, comprising:
   an expansion module, wherein the expansion module defines:
   an interior volume;
   a recess for receiving a retaining latch external to the expansion module for retaining the expansion module positioned with respect to an expansion module sleeve; and
   at least two throughholes to the expansion module interior and an alignment receptacle at one end of the expansion module;
   a latch release attached to the expansion module for expelling a retained latch from the recess; and
   an interface device positioned in the expansion module interior volume, wherein the interface device receives a) a standard data connector via one of the at least two throughholes and b) a power connector via another of the at least two throughholes, and wherein the interface device includes one or more expansion device connectors internal to the expansion module interior volume for providing at least one of data signals and power received from the standard data connector and the power connector to an expansion device.

2. The expansion module of claim 1, wherein insertion of an expansion module sleeve latch in the recess retains the expansion module positioned with respect to the expansion module sleeve.

3. The expansion module of claim 1, wherein prior to user manipulation of the latch release, the latch release is retained within the expansion module.

4. The expansion module of claim 1, wherein the latch release does not protrude beyond the exterior height of the recess.

5. The expansion module of claim 1, wherein the expansion device is at least one of a storage device, an input device, and an output device.

6. The expansion module of claim 1, further comprising:
   a power adapter connectable to the expansion module outside the expansion module sleeve.

7. The expansion module of claim 1, wherein the recess includes a throughhole sized to fit a portion of the latch release and enable the latch release to contact an inserted latch and expel the retained latch as a result of user manipulation of the latch release.

8. The expansion module of claim 1, wherein the standard data connector is a standard Universal Serial Bus Type B connector.

9. The expansion module of claim 1, wherein the data connector and power connector are positioned within the expansion module.

10. The expansion module of claim 1, wherein the expansion module is sized to fit within an expansion module sleeve in a computer system and the expansion module standard data connector connects to a standard data connection internal to the computer system and the expansion module power connector connects to a power connection internal to the computer system.

11. The expansion module of claim 10, wherein the expansion module standard data connector is connectable to a computer system external to the expansion module sleeve and the expansion module power connector is connectable to a power adapter external to the expansion module sleeve.

12. The expansion module of claim 10, wherein the expansion module standard data connector is a standard USB Type B data connector.

13. The expansion module of claim 1, wherein the alignment receptacle is 4 mm in diameter.

14. The expansion module of claim 1, wherein the alignment receptacle is 26.125 mm from the top of the expansion module.

15. The expansion module of claim 14, further comprising a second alignment receptacle, the second alignment receptacle located 26.125 mm from the top of the expansion module and 71.7 mm from the left side of the expansion module; and wherein the first alignment receptacle is located 35 mm from the left side of the expansion module.

16. The expansion module of claim 1, wherein the throughhole for receiving the standard data connector is located 18.875 mm from the top of the expansion module and 46.85 mm from the left side of the expansion module.

17. The expansion module of claim 1, wherein the throughhole for receiving the power connector is located 18.825 mm from the top of the expansion module and 60.85 mm from the left side of the expansion module.

18. An expansion module usable as an internal and external device, comprising:
  an expansion module, wherein the expansion module defines:
    an interior volume; and
    at least two throughholes to the expansion module interior and an alignment receptacle at one end of the expansion module; and
    an interface device positioned in the expansion module interior volume, wherein the interface device receives a) a standard data connector via one of the at least two throughholes and b) a power connector via another of the at least two throughholes, and wherein the interface device includes one or more expansion device connectors internal to the expansion module interior volume for providing at least one of data signals and power received from the standard data connector and the power connector to an expansion device and for retaining the expansion module in an expansion module sleeve.

19. A method for using an expansion module as an internal device and as an external device, comprising the steps of:
  inserting the expansion module into an expansion module sleeve in a computer system, wherein the inserting comprises:
    urging a latch of the expansion module sleeve into position to retain the expansion module in the expansion module sleeve, responsive to insertion of the expansion module into the expansion module sleeve;
  removing the expansion module from the expansion module sleeve; and
  externally connecting the expansion module to the computer system.

20. The method of claim 19, wherein the inserting step further comprises:
  mating a standard data connector of the expansion module with a standard data connection internal to the computer system.

21. The method of claim 19, wherein the removing step further comprises:
  responsive to user manipulation of a latch release on the expansion module, the latch release releasing the latch from the position retaining the expansion module in the expansion module sleeve.

22. The method of claim 19, further comprising the step of:
  externally disconnecting the expansion module from the computer system.

23. The method of claim 19, wherein the expansion device is at least one of a storage device, an input device, and an output device.

24. The method of claim 20, further comprising:
  mating a standard power connector of the expansion module with a standard power connection internal to the computer system.

25. The method of claim 20, wherein the standard data connector is a standard USB Type B data connector.

* * * * *